United States Patent [19]

Haeg

[11] 4,414,854

[45] Nov. 15, 1983

[54] ROTARY ACTUATOR ASSEMBLY

[75] Inventor: Steven R. Haeg, Shorewood, Minn.

[73] Assignee: MTS Systems Corporation, Eden Prairie, Minn.

[21] Appl. No.: 316,679

[22] Filed: Oct. 30, 1981

[51] Int. Cl.³ .............................................. G01N 3/22
[52] U.S. Cl. ....................................... 73/847; 74/609; 92/121
[58] Field of Search ............................ 184/6.26, 6.27; 384/400; 92/141, 121, 54, 106; 73/847, 848, 162; 74/609

[56] References Cited

U.S. PATENT DOCUMENTS 2,949,045  8/1960  Rushing ................................ 74/609
3,690,168  9/1972  Petersen ................................ 73/162

Primary Examiner—Jerry W. Myracle
Attorney, Agent, or Firm—Kinney, Lange, Braddock, Westman and Fairbairn

[57]  ABSTRACT

An improved rotary actuator assembly includes a stationary shroud extending between first and second spaced apart stationary support members that aids assembly of the rotary actuator and collects drain lubricating oil during operation. A rotating member is supported between the first and second stationary supports by bearings positioned within the first support and a bushing within the second support. The shroud covers a portion of the rotating member between the first and second stationary supports.

7 Claims, 4 Drawing Figures

ROTARY ACTUATOR ASSEMBLY

BACKGROUND OF THE INVENTION

1. Field of the Invention

The present invention relates to the structure of rotary actuator assemblies which provide a dynamic torque input to a test specimen.

2. Description of the Prior Art

Rotary hydraulic actuators are commonly known and are used in testing specimens such as shafts or axles. Typically, the shaft or axle is driven at one end with a motor and is connected at the other end in a suitable manner to the rotary actuator.

The rotary actuator is used to introduce dynamic torque loads or forces into the shaft or axle to simulate the shaft's actual usage in a machine, such as an axle in an automobile. During such simulation testing, the safety and reliability of the axle is determined.

Typically, the rotary hydraulic actuator introduces the dynamic torque loads through a servovalve controlled hydraulic system, with the hydraulic forces being delivered into a rotating hydraulic actuator of the rotary actuator through a hydraulic commutator. A typical construction of such a hydraulic actuator is shown in FIG. 2 of the Petersen patent, U.S. Pat. No. 3,690,168, which is assigned to the same assignee as the present invention. The dynamic torque loads need to be introduced in a consistent manner such that reproducable and statistically sound testing can be performed on the specimen. Consequently, the rotary actuator has to be built in a precise manner.

The rotary hydraulic actuator includes an integral shaft portion that is positioned between the test specimen and the hydraulic commutator. The shaft portion is mounted on a heavy duty bearing to insure true location of the shaft portion at high speeds thereby providing the consistent dynamic torque loads to test specimens while reacting to any side loads. Typically, the heavy duty bearing requires a fluid lubricant (oil) to be applied thereto under pressure. The lubricating oil is normally applied from the outside of the bearing, while seals on the other side of the bearing keep the fluid lubricant from escaping and landing on rotating parts and splashing. The assembly of the shaft portion and bearings along with the seals is an expensive one in trying to produce a durable and precise rotatable bearing support.

SUMMARY OF THE INVENTION

The present invention includes a rotary actuator assembly that provides a consistent dynamic torque load to a test specimen while being substantially easy to assemble. The rotary actuator assembly includes a stationary shroud connecting first and second spatially separated stationary supports. As shown, a rotary hydraulic actuator having an integral shaft portion is rotatably connected to the first stationary support by bearings. The bearings are lubricated by a lubricating oil with the lubricant permitted to flow through the bearing draining into the area between the first and second stationary support and covered by the shroud. While the hydraulic actuator is being rotated within the shroud, the shroud collects the oil that seeps through the bearing preventing it from being splashed, and draining the oil through a bottom drain hole.

With no need for expensive oil seals, the first stationary support may be machined with a simple annular shoulder which provides better alignment for the rotating portion of the shaft of the hydraulic actuator. The shaft portion is simply abutted against the annular shoulder without any interference from any oil seal. In addition, the first and second stationary supports are easily and quickly aligned with respect to each other by merely piloting the end of the shroud on annular machined surfaces on the plates. The first and second stationary supports are preferably held in engagement with the shroud by a plurality of bolts extending therebetween.

DETAILED DESCRIPTION OF THE PREFERRED EMBODIMENTS

Figure 1:
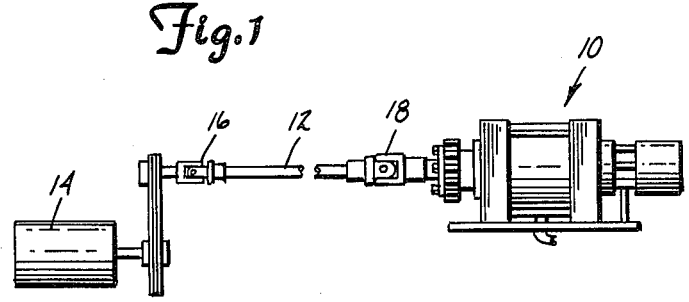
FIG. 1 is a front view of a rotary actuator in use testing a test specimen.

A rotary hydraulic actuator is generally indicated at 10 in FIG. 1. The rotary actuator 10 is typically used in testing specimens such as shafts or axles for various mechanical characteristics. As shown in FIG. 1, preferably the rotary actuator 10 is used to test a test specimen 12 which is driven by a motor 14. Test specimen 12 is typically a shaft or an axle and is suitably connected by a coupling 16 to the motor 14 and by a coupling 18 to the rotary actuator 10. The test specimen 12 is driven by the motor and in turn turns an inner rotating member (to be discussed subsequently) of the rotary actuator 10. The rotary actuator 10 in turn provides dynamic torque loads to the test specimen simulating the test specimen's actual usage in a machine, such as an axle would be used in an automobile.

Figure 2:
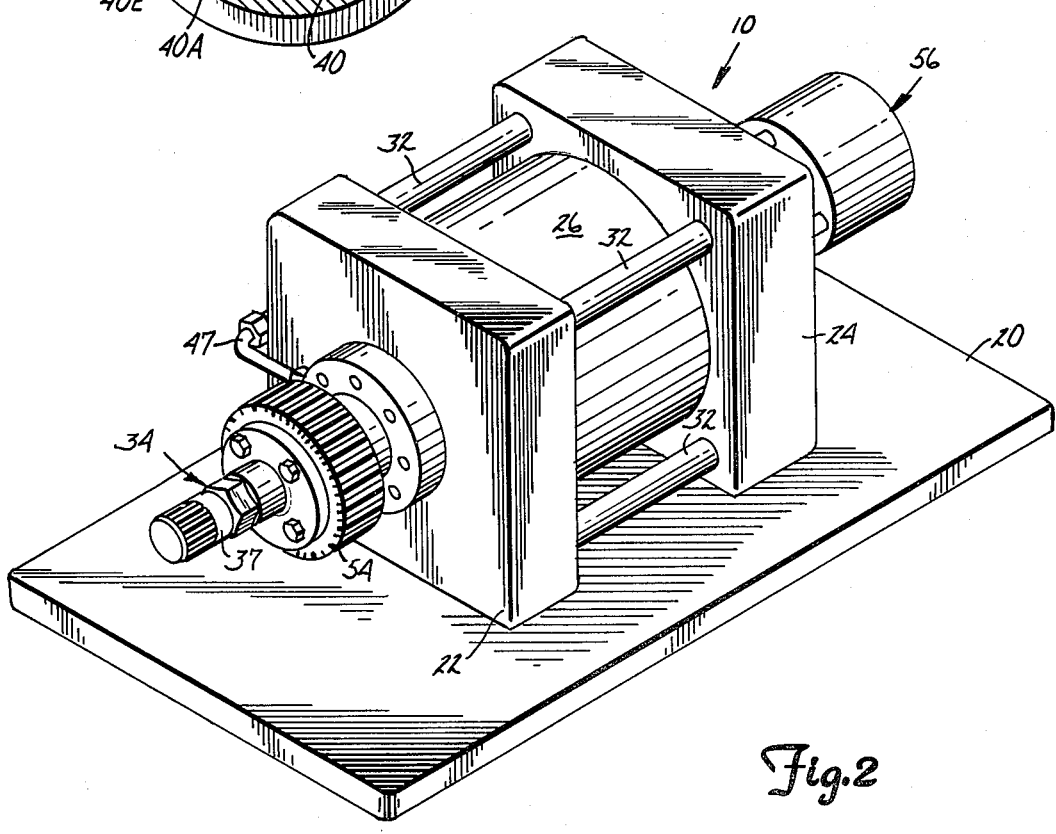
FIG. 2 is a perspective view of the rotary actuator of the present invention.
Figure 3:
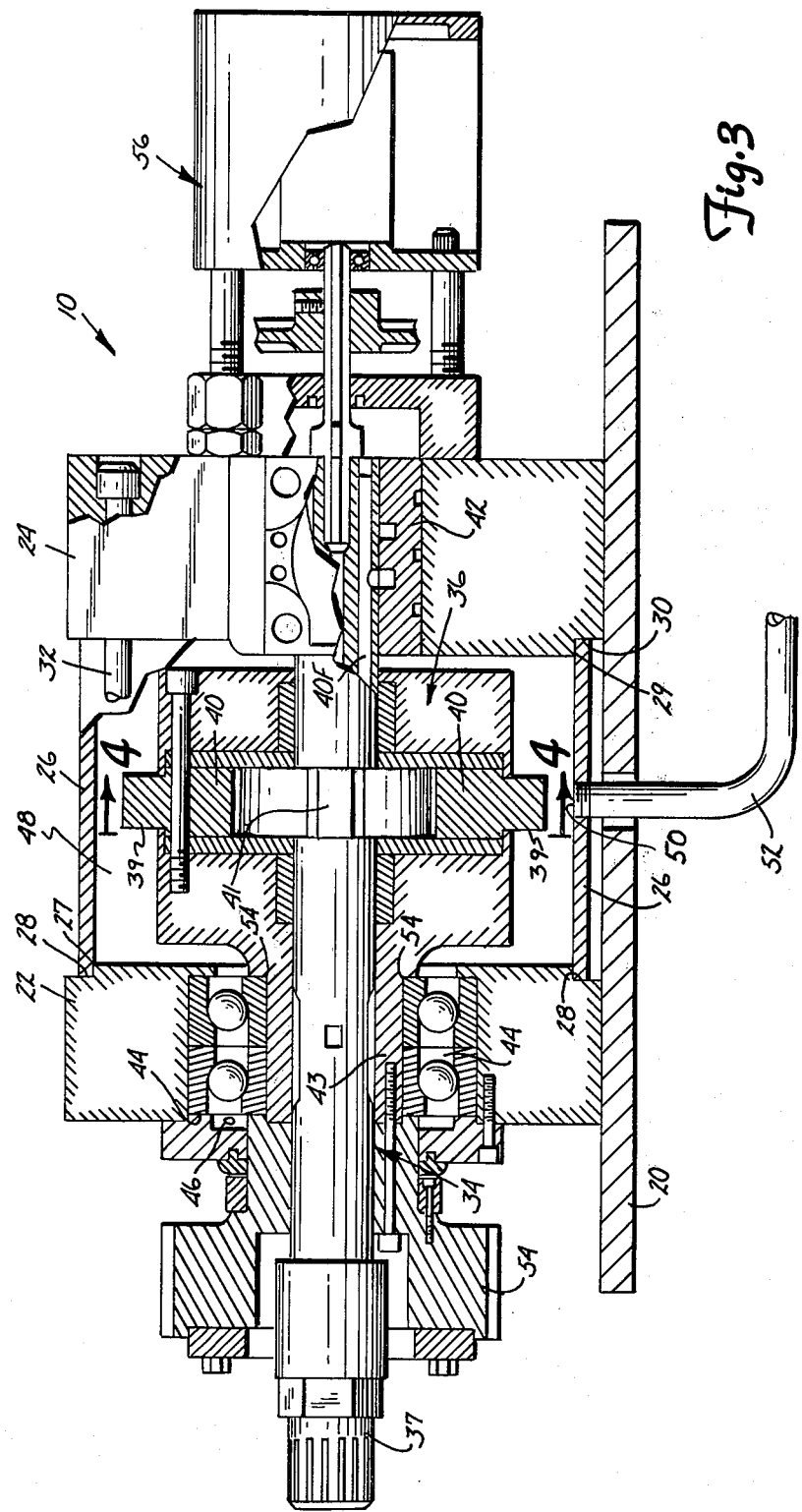
FIG. 3 is a cross sectional view of the rotary actuator with some portions shown whole for purposes of clarity.

In FIGS. 2 and 3, a preferred embodiment of the rotary actuatory 10 is shown disconnected from the test specimen. The rotary actuator 10 includes a base 20 on which is mounted a pair of spaced-apart stationary first and second plates 22, 24, respectively. The plates 22, 24 abut against a shroud 26 preferably cylindrical in shape. The shroud 26 aligns the plates 22, 24 in a substantially parallel relationship to each other by being piloted on annular surfaces 27 and 29 and by engaging respective shoulder portions 28, 30 which are suitably machined in the plates 22, 24, respectively. A plurality of bolts 32 positioned about the exterior of the shroud 26 hold the plate 22, shroud 26 and plate 24 in an assembled unit.

A shaft 34 is positioned to rotate within the shroud 26 and between the plates 22, 24. The shaft 34 extends through suitable openings in the plates 22, 24. An end 37 of the shaft 34 is connected to the coupling 18, as shown in FIG. 1, to cause the shaft 34 to be rotated along with the test specimen 12.

While the shaft 34 is rotating with the test specimen 12, a rotary hydraulic actuator generally indicated at 36 provides dynamic torque loads to the shaft 34 and consequently to the test specimen. The hydraulic actuator 36 comprises an outer housing 39 having internal vanes 40 fixed thereto. The housing shaft 34 has vanes 41 extending therefrom. The hydraulic actuator is a typical actuator and is generally explained in the Petersen U.S.

Figure 4:
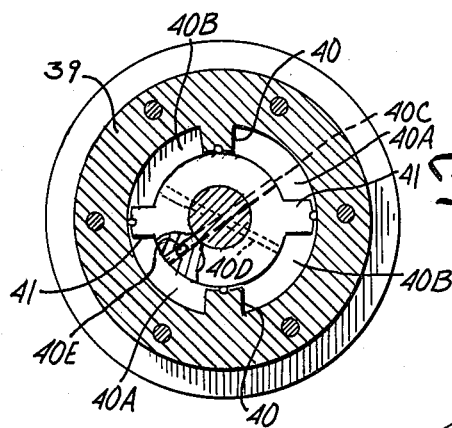
FIG. 4 is a part schematic sectional view taken on line 4—4 in FIG. 3.

Pat. No. 3,690,168. As may be seen in FIG. 4, introduction of pressure in the chambers 40A will cause relative rotary motion between the housing 39 and shaft 34 in one direction, (note that a passageway 40C connects these chambers together) and the chambers 40B are then connected to drain. When chambers 40B are subjected to hydraulic pressure (they also are connected by a passageway 40D), with chambers 40B connected to drain, relative rotary motion between shaft 34 and housing 39 is caused in the opposite direction.

The actuator 36 is preferably servovalve controlled with the hydraulic fluid (oil) being introduced into passageways 40E and 40F in the shaft 34, which connect with passageways 40C and 40D respectively. Hydraulic fluid under pressure is provided to passageways 40E and 40F through a hydraulic commutator 42 in a known manner from a servovalve.

The shaft 34 and an end sleeve member 43 of the housing 39 are rotatably positioned within an opening in the plate 22 on a suitable bearing 44. The bearing 44 is of the heavy duty type, and is shown as a ball bearing, to accommodate high loads. A suitable lubricant (oil) is fed to the bearing 44 by way of a jet 46 from the outside through a conduit 47 from a source as illustrated in FIG. 2. The lubricant flows through a conduit 47 from a source and through the bearing and drips in an interior space 48 defined by the plates 22, 24 and the shroud 26. The shroud 26 prevents the oil from splashing or spraying when the oil lands on the rotating surfaces of the housing 39. An opening 50 positioned in a bottom surface of the shroud 26 allows the lubricant to drain from the shroud through a suitable conduit 52 to a collection point (not shown). With the shroud 26, the need for interior seals which are subject to leakage and wear on bearing 43 is eliminated. The end plates, which support housing 39 and shaft 34 are easily and simply aligned. The housing 39 has a machined annular shoulder 54 that abuts on the inner race of bearing 44 and is held in the bearing with a hub 54 that is clamped to the sleeve member 43 of the housing 39. The shaft 34 extends through sleeve member 43 to the exterior of the actuator assembly 10 and as explained can be rotated relative to the housing by selectively pressurizing chambers 40A and 40B. The relative rotation between the housing 39 and shaft 34 is limited in amount and is used for changing the torque carried by shaft 34 and specimen 12. The reaction load on the shaft is transmitted by the housing through hub 54, which can be drivably connected to a load (as shown it is a gear) or can be connected to a 4-square set up as shown in U.S. Pat. No. 3,690,168.

The other end of the shaft 34 is guided in commutator or hydraulic slip ring 42 which rotatably guides the shaft within the plate 24. On this end of the shaft, the commutator may be sufficient for proper rotation of the shaft 34.

A rotary transformer 56 may be coupled to shaft 34 to provide a coupling for transmitter torque signals from shaft 34 to readout or control equipment.

CONCLUSION

The shroud 26 accurately aligns the plates 22 and 24 in a substantially parallel relationship. With the shroud 26, the lubricating oil is allowed to flow through the bearings and within the interior of the shroud, where the fluid is collected and drained. The lubricating fluid flowing through the bearings eliminates the need for interior seals and permits building the rotary actuator in a compact configuration. In addition, the end plates are easily and simply mounted by using the annular pilot surfaces that slip into the shroud.

The shroud reduces noise, eliminates unwanted spraying of drain hydraulic oil and lubricating oil and also minimizes the drag from turbulent air around the housing. The actuator housing spins in the order of 6000 rpm in many applications and the increased safety of the shroud is substantial.

Although the present invention has been described with reference to preferred embodiments, workers skilled in the art will recognize that changes may be made in form and detail without departing from the spirit and scope of the invention.

What is claimed is:

1. An improved rotary actuator assembly for introducing dynamic torque loads into a rotatable test specimen, the improved assembly comprising:
   a first stationary support;
   a second stationary support in a fixed spatial relationship with the first stationary support;
   bearing means positioned on the first stationary support;
   a rotary hydraulic actuator rotatably supported by the bearing means and positioned between the first and second stationary supports, said rotary hydraulic actuator having a shaft and a housing, the relative rotational position of the shaft and housing being controllable and the shaft extending out of the housing and being mounted for rotation on the second support, said shaft having passageways therein, a hydraulic commutator mounted in the second support and surrounding the shaft, said passageway in the shaft mating with said commutator;
   means to couple the actuator to a rotatable test specimen and to couple the actuator to a load to permit loading the specimen under torque transmitted through the actuator; and
   a shroud extending between and mounted on the first and second stationary supports and surrounding the rotary actuator to shield the actuator with a closed stationary shield as the actuator and specimen are rotated.

2. An improved rotary actuator assembly for introducing dynamic torque loads into a test specimen, the improved assembly comprising:
   a first stationary support;
   a second stationary support in a fixed spatial relationship with the first stationary support;
   bearing means positioned within the first stationary support;
   means for transmitting torque forces to the test specimen rotatably supported by the first bearing means and a portion thereof rotating between the first and second stationary supports;
   lubricating means for lubricating the first bearing means with a lubricating fluid; and
   a stationary shroud with a drain aperture in the lower surface thereof and extending between the first and second stationary supports and enveloping the means for transmitting torque forces such that excess lubricating fluid from the bearing means is caught by the stationary shroud and drained through the drain aperture.

3. The assembly of claim 2 wherein the first and second stationary supports have first and second shoulders, respectively, engaging opposite ends of the stationary shroud thereby aligning the first and second stationary supports in a substantially parallel relationship.

4. The assembly of claim 2 wherein the means for transmitting torque forces to the test specimen includes a rotary hydraulic actuator having a pair of elements including a housing rotatably mounted in the bearing means and a shaft, the relative rotational position of the shaft and housing being controllable, the test specimen being attached to one of the elements and the other element having means to couple it to a load.

5. The assembly of claim 4 wherein said shaft extends through said housing and has passageways therein for carrying hydraulic fluid under pressure to said actuator, a hydraulic commutator rotatably mounted on said shaft and mounted on said second stationary support.

6. The assembly of claim 2 and further including a plurality of fasteners geometrically spaced about the exterior of the stationary shroud fastening the first and second stationary supports and the shroud in an assembled unit.

7. An improved rotary actuator assembly for introducing dynamic torque loads into a rotatable test specimen, the improved assembly comprising:

a first stationary support having a first annular shoulder;

a second stationary support in a fixed spatial relationship with the first stationary support and having a second annular shoulder;

bearing means positioned on the first stationary support;

a rotary hydraulic actuator rotatably supported by the bearing means and positioned between the first and second stationary supports, said rotary hydraulic actuator having a shaft and a housing, the relative rotational position of the shaft and housing being controllable;

means to couple the actuator to a rotatable test specimen and to couple the actuator to a load to permit loading the specimen under torque transmitted through the actuator; and a shroud extending between and mounted on the first and second stationary supports and surrounding the rotary actuator to shield the actuator with a closed stationary shield as the actuator and specimen are rotated, the opposite ends of the stationary shroud piloting on the shoulders and thereby aligning the first and second stationary supports in a substantially parallel relationship, the shaft extending through the actuator housing and being rotatably mounted in the second stationary support.

* * * * *